United States Patent [19]

Bubnich et al.

[11] 4,101,868

[45] Jul. 18, 1978

[54] VEHICLE PARKING GUIDE AND SIGNALING DEVICE

[76] Inventors: Frank J. Bubnich; Marketta A. Bubnich, both of 3224 Emmaus, Zion, Ill. 60099

[21] Appl. No.: 836,721

[22] Filed: Sep. 26, 1977

[51] Int. Cl.² .................. B60Q 9/00; B60Q 11/00; B60Q 5/00

[52] U.S. Cl. .............................. 340/51; 40/486; 116/28 R

[58] Field of Search .................. 116/28 R, 4, 42; 350/167; 40/106.52, 106.53, 106.54, 137, 61 R, 61 A; 340/61, 51; 33/264, 288

[56] References Cited

U.S. PATENT DOCUMENTS

| | | | |
|---|---|---|---|
| 1,782,328 | 11/1930 | Wearham | 40/61 A |
| 2,454,896 | 11/1948 | Traub | 116/28 R |
| 3,121,416 | 2/1964 | Gizdich | 116/28 R |
| 3,219,972 | 11/1965 | Williams | 116/28 R |
| 3,621,807 | 11/1971 | Chuwankang | 116/28 R |
| 3,977,354 | 8/1976 | Mazurek | 116/28 R |
| 4,036,165 | 7/1977 | Wood | 116/28 R |

*Primary Examiner*—S. Clement Swisher
*Assistant Examiner*—Denis E. Corr

*Attorney, Agent, or Firm*—Merriam, Marshall & Bicknell

[57] ABSTRACT

A parking guide and signaling device for cars and trucks to assist the driver parking a vehicle safely in a designated parking area comprising a housing section with a window therein which is closed by a pane of transparent sheet material through which indicia can be seen only when the indicia is placed in contact with the rear surface of the pane and with the housing having pivotally mounted therein an actuating lever biased so that the upper end of the actuating arm is normally spaced rearwardly of the pane and having secured to the upper end of the arm a plate with warning indicia on the front surface thereof adapted to be moved into contact with said pane and the lower end of the actuating arm extending forwardly below the housing section and adapted to be moved pivotally rearwardly by a vehicle as it moves into a designated parking area and bringing the warning indicia place into contact with said pane. The housing section can also be provided with a buzzer or like electrical audible or visual signaling means having spaced electrical contacts which are connected by a contact element associated with the actuating arm when the plate is moved toward and into contact with the pane.

6 Claims, 7 Drawing Figures

U.S. Patent  July 18, 1978  Sheet 2 of 2  4,101,868
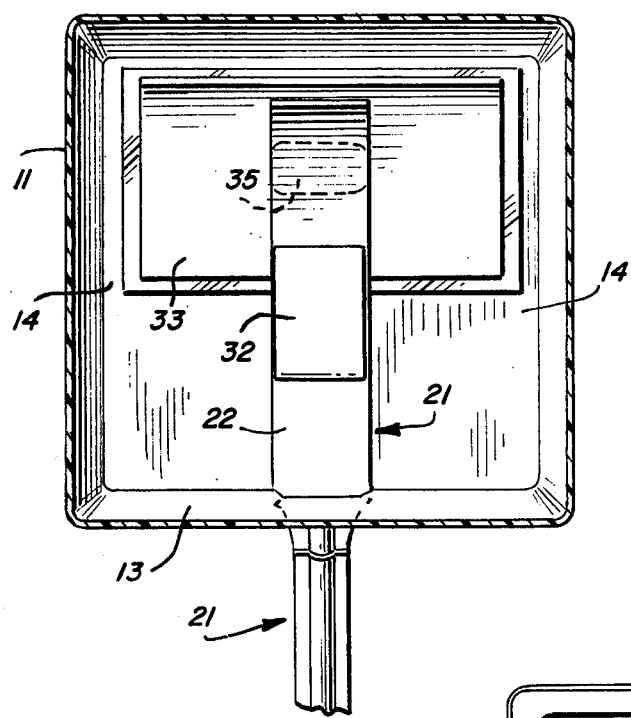
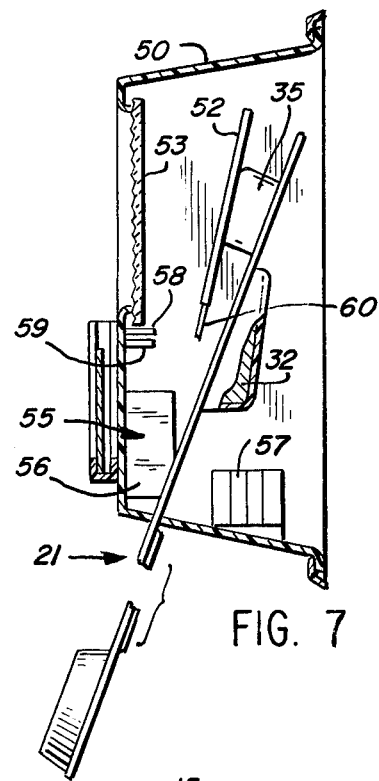
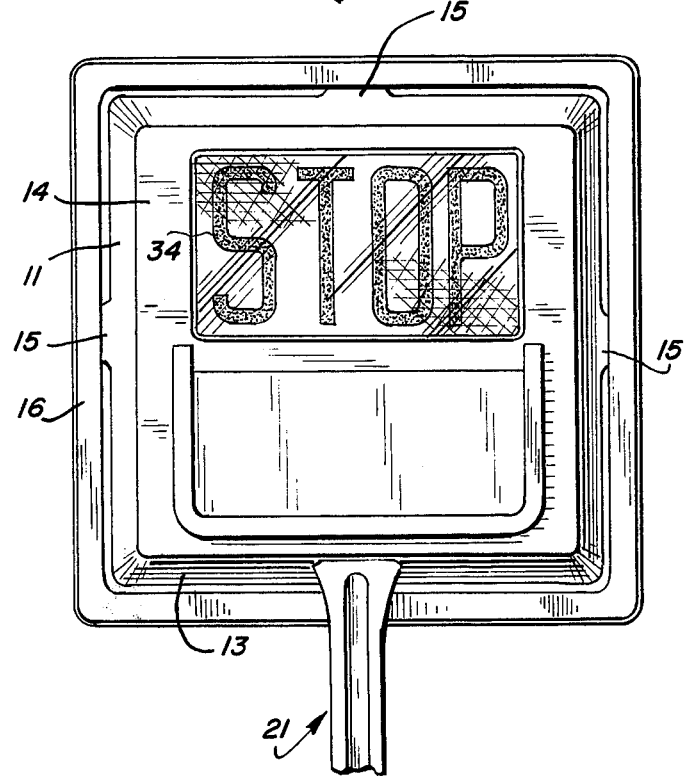

VEHICLE PARKING GUIDE AND SIGNALING DEVICE

The invention relates generally to a vehicle parking and signaling device which aids in parking a vehicle in a designated position in a garage, drive-in or the like establishment and which gives the driver of the vehicle notice when a vehicle has reached a designated position within the parking area.

Many devices have been disclosed for giving the driver of a vehicle notice when his vehicle has reached a predetermined position within a garage or parking area. Among the devices for giving a driver notice when his vehicle should be stopped to avoid damaging the car or the wall of the garage or the like are the devices shown in U.S. Pat. Nos. 3,977,354, 3,621,807 and 3,121,416. These devices have failed to achieve wide spread commercial acceptance, however, because of their cost and complexity.

It is therefore an object of the invention to provide an improved parking guide and signaling device for assisting in parking a vehicle.

It is a further object of the present invention to provide a vehicle parking guide and signaling device which is more dependable and more economical than like devices heretofore produced.

Other objects of the present invention will be apparent in the detailed description and claims to follow when read in conjunction with the accompanying drawing wherein:

FIG. 5 is a rear elevational view partially in vertical section taken along the line 5—5 of FIG. 4;

FIG. 6 is a front elevational view taken along the line 6—6 of FIG. 4; and

FIG. 7 is a schematic fragmentary vertical sectional view partially in elevation of a modified form of the invention.

Figure 1:
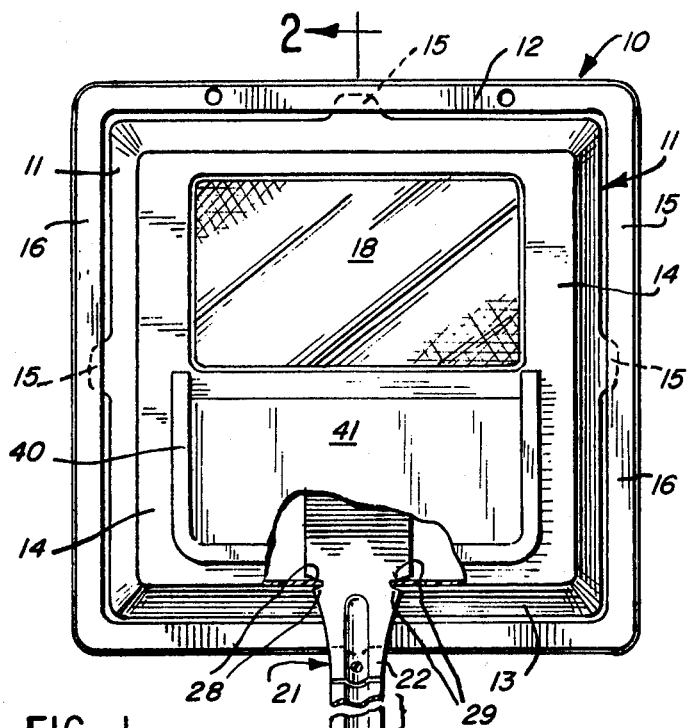
FIG. 1 is a front elevational view of a parking guide and signaling device embodying the present invention.

The objects of the invention are achieved by providing a vehicle parking guide and signaling device 10 comprising a generally rectangular disc-shaped housing section 11, including upper and lower walls 12, 12a and side walls 13, 13a and front wall 14. The tabs 15 extending perpendicularly from the lower edges of the walls 12, 12a, 13, 13a are adapted to detachably engage in slots formed in a backing plate 16 which comprises the rear wall of the device 10. Any suitable mounting means for securing the signaling device 10 to a vertical wall or post are provided on the backing plate 16, as by adhesive strips 16a.

The front wall 14 is provided with a rectangular opening or window 17 which extends substantially across the upper portion of the front wall 14 with a plastic or glass pane 18 supported by a flange 19 formed around the opening 17 in the front wall 14.

The lower wall 13 of the housing 11 is provided with a longitudinally extending slot 20 at about the midpoint of the wall 13 in which an actuating lever or rod 21 is pivotally mounted. The actuating lever 21 is preferably formed of a plurality of generally flat interconnecting sections 22, 23, 24, each of which has a small hole 25 formed adjacent the ends thereof to receive a fastener member 26 which secures the overlapping ends of the sections 22, 23, 24, so that the actuating lever 21 has the desired length. The upper section or arm portion 22 has intermediate the ends thereof an enlarged support section 27 with a pair of laterally extending rounded pivotal support surfaces 28, 29 formed thereon, adapted to pivotally engage the lower wall 13.

Figure 2:
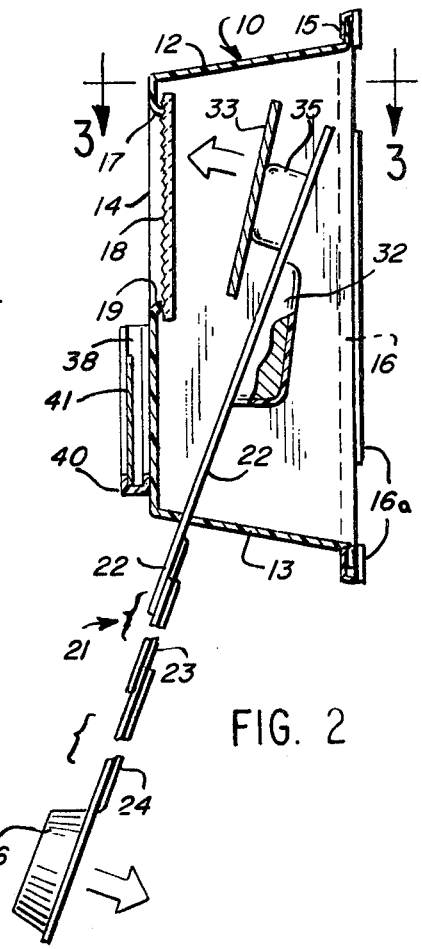
FIG. 2 is a vertical sectional view partially in elevation taken along the line 2—2 of FIG. 1.
Figure 4:
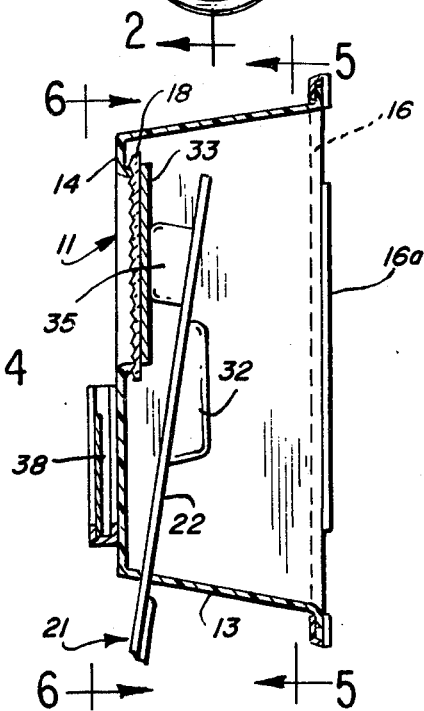
FIG. 4 is a fragmentary vertical sectional view partially in elevation of the device of FIG. 2 in a different operative position.
Figure 3:
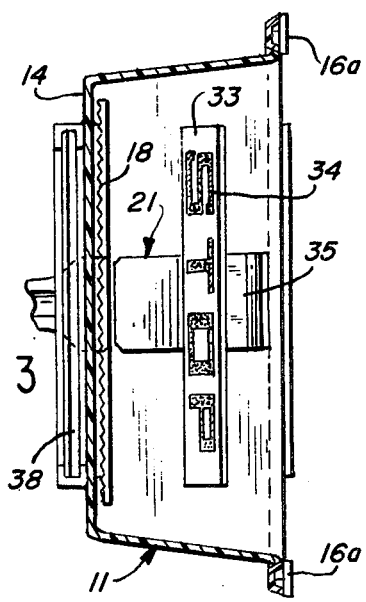
FIG. 3 is a horizontal sectional view partially in plan taken along the line 3—3 of FIG. 2.

The upper section or arm portion 22 of the actuating lever 21 also has secured on the back surface thereof at a point above the pivotal support section 27 and spaced from the upper end thereof a weight element 32 extending rearwardly thereof to bias the lever arm so that the upper end of the actuating lever 21 is normally spaced rearwardly of the opening 17 formed in the front wall 14 of the housing section 11 (as shown in FIG. 2).

A flat plate 33 having warning indicia 34, such as "STOP", imprinted on the forward surface thereof is secured to the upper end of the actuating lever 21 by means of a mounting block 35 which positions the entire indicia bearing surface of the plate 33 directly in contact with the rear surface of the pane 18 when the upper end of the actuating lever 21 is moved pivotally into its most forward position with the indicia 34 centered in the opening 17. If desired, the upper end of the actuating lever 21 can be formed with a suitable angle therein to permit mounting the plate 33 directly on the forward surface thereof so that the indicia bearing surface of the plate 33 will be in contact with the pane 18 when the lever 21 is actuated.

The lower end of the actuating lever 21 normally extends downwardly and forwardly from the pivotal supports 30, 31 on the lower wall 13 of the housing 11 as a result of the biasing weight 32 being secured to the upper section 22 of the actuating lever 21. The length of the actuating lever 21 is such that the lower end section or arm portion 24, preferably having an enlarged target section 36 thereon as an aid in centering the vehicle in the parking area, will be engaged by the bumper of the vehicle being parked as the vehicle approaches the desired final parking position and will pivotally move the lower end of the actuating lever 21 rearwardly and move the plate 33 on the upper end of the actuating lever 21 forwardly into engagement with the rear surface of the pane 18 when the vehicle is in the designated parking space. The lever arm 21 is preferably formed of a material which is readily yieldable and resilient so that it has a high degree of flexibility to permit the vehicle moving a distance beyond the designated parking spot without causing any damage to the actuating lever 21 or the other parts of parking guide 10.

The pane 18 which is mounted in the opening 17 in the front wall 14 of the housing section 11 is formed of a sheet of plastic or glass material with the front surface thereof provided with a plurality of indentations, such as pyramid-shaped depressions, formed over the entire front surface thereof with the rear surface being a smooth, plane surface. A pane formed in the foregoing manner makes it impossible to read indicia therethrough until a flat plate bearing the indicia directly contacts the smooth plane rear surface thereof. An example of such a material is the sheet material designated "pyramid" plastic. Other equivalent materials through which indicia can be read only when brought into direct contact with the smooth rear surface thereof can be used in place of the foregoing "pyramid" plastic sheet material to form the pane 18 in the opening 17 of the front wall 14.

The front wall 14 of the housing 11 is also preferably provided with one or more compartments or receptacles 38 for holding advertising literature or messages. As best shown in FIGS. 1 and 2, the receptacle 38 is formed of a "U"-shaped strip 40 mounted on the lower portion of the front wall 14 with a flat strip 41 extending across the front edges of the "U"-shaped strip to provide the front wall of the receptacle 38.

In a modified form of the invention shown in FIG. 7 the housing section 50 has associated therewith signaling means 55 which is actuated when the "STOP" plate 52 is moved toward and into contact with the pane 53 for providing an audible warning signal in addition to a visual "STOP" signal. The signaling means 55 shown in FIG. 7 can comprise a buzzer 56 mounted within the housing 50 with the buzzer connected in series with a battery 57 or other source of electrical current and two spaced electrical contacts 58, 59 which are in series with the buzzer and which are preferably resiliently mounted on the inner surface of the front wall 54 of the housing 50 adjacent the pane 53. An electrical conductor element or strip 60 is mounted on the lower edge of the plate 52. The conductor 60 is insulated electrically from the plate 52 and is adapted to connect the spaced electrical contacts 58, 59 in the buzzer electrical circuit when the plate 52 is moved pivotally forwardly, preferably before the plate 52 contacts the pane 53 and thereby closing the buzzer circuit and causing the buzzer to emit an audible warning signal. When it is desired to have the audible signal commence before the vehicle reaches the final parking position, the ends of the resilient electrical contacts 58, 59 extend a short distance from the front wall toward the plate 52 so that the conductor strip 60 will complete the electrical circuit across the contacts 58, 59 before the plate 52 is moved into direct contact with the pane 53 and before the "STOP" indicia becomes visible through the pane 53.

It should be understood that in place of the buzzer 56 any other electrical signaling means can be used, such as light or flasher. A circuit leading to a signaling board in a location remote from the parking area can also be connected with the spaced contacts 58, 59, if desired.

I claim:

1. A vehicle parking guide and signaling device comprising, a housing section adapted to be supported in a vertical position and having a front wall with an opening therein, said opening being substantially closed by a pane of material through which indicia become visible only when a flat plate having indicia on the front surface thereof is in direct contact with the rear surface of said pane, an actuating means supported by said housing section, said actuating means comprising an upper arm portion movable toward and away from said pane and normally maintained space rearwardly of said pane, a flat plate with warning indicia on the front surface thereof mounted on said upper arm portion and adapted to be moved forwardly into direct contact with the rear surface of said pane when said upper arm portion of said actuating lever is moved into a forwardly operating position, and said actuating means having a lower arm portion adapted to be engaged by a vehicle being parked and effect forward movement of the upper arm portion of said actuating means and move said plate into direct contact with the rear surface of said pane when said vehicle is in a designated parking position; thereby making said warning indicia visible to an observer viewing said pane from within the said vehicle.

2. A vehicle parking guide and signaling device as in claim 1, wherein the lower arm of said actuating means has an enlarged target section thereon to assist a said observer centering said vehicle within said parking area.

3. A vehicle parking guide and signaling device as in claim 1, wherein said front wall has a compartment for supporting advertising literature.

4. A vehicle parking guide and signaling device as in claim 1, wherein normally spaced electrical contacts are mounted within said housing, an electrical signaling means electrically connected with said contacts, said actuating means having mounted thereon means for closing said spaced contacts when said upper arm is moved pivotally forwardly a predetermined distance; whereby said electrical signaling means is activated.

5. A vehicle parking guide and signaling device as in claim 4, wherein said means for connecting said spaced contacts effects the closing of said electrical contacts before said plate is moved into direct contact with said pane.

6. A vehicle parking guide and signaling device comprising, a housing section adapted to be supported in a vertical position and having a front wall with an opening therein, said opening being substantially closed by a pane of material through which a warning indicia becomes visible only when a flat plate having the indicia on the front surface thereof is in direct contact with the rear surface of said pane, an actuating lever pivotally supported by said housing section at a pivot point spaced below said opening, said actuating lever having an upper section extending above said pivot point with the upper end thereof disposed adjacent said opening, said actuating lever being biased to normally maintain said upper end spaced rearwardly of said opening, a flat plate with signaling indicia on the front surface thereof mounted on said upper end, said plate adapted to be moved forwardly directly into contact with said rear surface of said pane when the upper section of said actuating lever is moved forwardly, and said actuating lever having a lower section extending below said pivot point which is adapted to be engaged by a vehicle being parked and effect forward movement of said upper arm end and bring said plate into direct contact with the rear surface of said pane when said vehicle is in proper parking position; thereby making said indicia visible to an observer viewing said pane from within the said vehicle.

* * * * *